Oct. 18, 1960
E. LEITCHNER
2,956,597
TREADLE-OPERATED UNDER-TABLE TRAVELING SAW
Filed Nov. 10, 1958
2 Sheets-Sheet 1
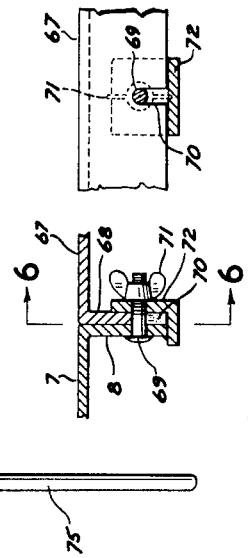
FIG. 6
FIG. 5
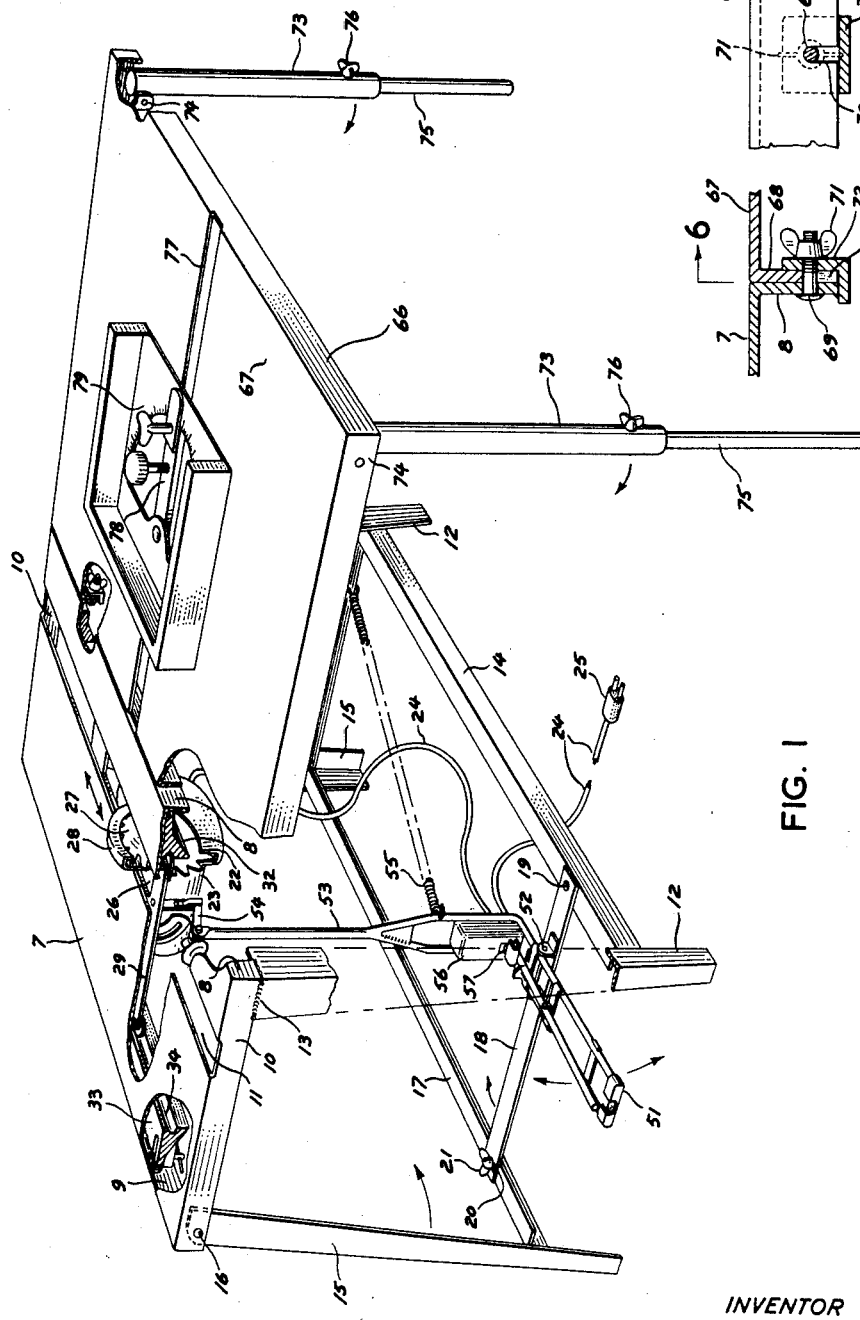
FIG. 1
INVENTOR
EDWARD LEITCHNER
BY: *Frederick C. Bromley*
ATTORNEY Oct. 18, 1960  E. LEITCHNER  2,956,597
TREADLE-OPERATED UNDER-TABLE TRAVELING SAW
Filed Nov. 10, 1958  2 Sheets-Sheet 2

INVENTOR
EDWARD LEITCHNER

BY: Frederick E. Bromley
ATTORNEY

United States Patent Office 2,956,597
Patented Oct. 18, 1960

2,956,597

TREADLE-OPERATED UNDER-TABLE TRAVELING SAW

Edward Leitchner, 29 Johnson St., Barrie, Ontario, Canada

Filed Nov. 10, 1958, Ser. No. 772,782

3 Claims. (Cl. 143—47)

My invention relates to improvements in power saw tables of the kind in which a portable electrically driven hand saw is employed and invertedly mounted on a carriage beneath a table top with the blade disposed to operate in a slot and to travel along the slot in performing cutting operations. Rotary disc saws of this type are widely employed in construction work by carpenters and others for facilitating rip sawing, cross-cut sawing and miter and/or angular sawing. It is well recognized that the use of such a saw on a saw table in the manner referred to enables work to be performed expeditiously and with the required degree of accuracy. The travel of the saw is under the control of a foot pedal manipulated by the operator and the work is placed against an adjustable gauge of the conventional type.

A general object of the present invention is to provide an improved power saw table of the kind referred to and one which will serve to greater advantage for rip sawing, cross-cut sawing and miter and/or angular sawing.

Another object of my invention is to provide a power saw table in which a standard portable electric hand saw is mounted on a carriage supported in ways devised with adjustable securing means which enables the carriage to be readily inserted and removed from the ways so that when the hand saw is not required to be used on the table, it can be removed along with the carriage for use as a unit with the carriage for regular hand use apart from the table.

Still another and important object of my invention is to provide a power saw table which can be collapsed for folding in small space whereby it may be readily transported from place to place. In collapsed condition it is partly dismantled and may be stored in the trunk of an automobile so that a workman can transport it in his motor car.

Still another object of the invention is to provide a power saw table comprising a main table supported on legs and attached to a supplemental table equipped with a gauge guidably supported on the table surface and capable of being adjusted for carrying out rip sawing, cross-cut sawing and miter and/or angular sawing. Desirably both the main table and the supplemental table are independently foldable and are detachably connected together so that they may be dismantled at will and individually folded for compact storage.

Another and important object of my invention is to provide a power table structure of the kind herein referred to which is inexpensive to manufacture and highly serviceable in use.

With these and other objects in view, my invention comprises the novel construction and arrangement of parts as described in the ensuing specification and shown in the accompanying drawings which form a part thereof:

Fig. 1 is a general perspective view of the main table and supplemental table with parts broken away to more clearly show details of the construction;

Fig. 5 (sheet 1) is a cross sectional detail showing the attachment means by which the main table is secured to the supplemental table; and Fig. 6 is a vertical section on line 6—6 of Figure 5.

Figure 2:
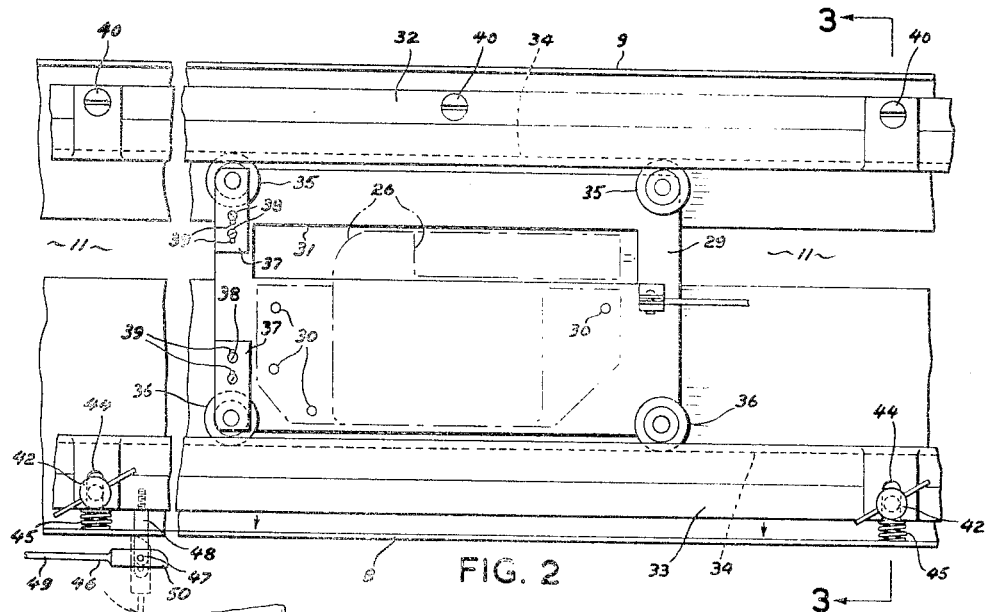
Fig. 2 is a fragmentary view of the underside of the table top depicting the carriage mounted in the ways.

In carrying out the invention, there is provided a power table saw structure comprising a main table having an elongated top desirably of metal which is generally denoted at 7. The table top is supplied with down-turned flanges at its marginal edges, there being side flanges denoted at 8 and 9 (Fig. 2) and end flanges indicated at 10. The upper surface of the top 7 is smooth and interrupted by a longitudinally extending saw blade slot 11 shown as extending the full length of the table by way of preference.

There is a supporting leg structure of the top 7 comprising spaced legs 12 rigid with the top 7 at one side thereof. These legs which are of metal may be attached by welding, indicated at 13, or otherwise according to dictates of manufacture. A brace member 14 horizontally arranged extends between the legs 12 and is permanently and rigidly attached to the same. The other side of top 7 is supplied with a similar pair of legs indicated at 15 but each of these legs is pivoted as at 16 at its upper end in order to swing inwardly toward the fixed legs 12. The foldable legs 15 are attached together by horizontal brace member 17 which is substantially on a level with the brace member 14 and is connected thereto as by a cross bar 18. Cross bar 18 holds the legs in spread-apart condition and is arranged to allow for the folding of the legs 15. To this end it is pivoted as at 19 to one of the brace members and detachably connected to the other brace member as by a slot 20 and thumb screw 21. Accordingly, it will be manifest that by loosening the thumb screw 21 the cross bar 18 can be swung to overlie the brace member on which it is pivoted. This allows for the folding of the swingable legs 15 toward the fixed legs 12 when it is desired to collapse the main table for storage and/or transportation.

As previously mentioned, there is employed a portable electrically driven hand saw generally denoted at 22 of which there are several makes on the market and each comprises an electric motor 23 supplied with a cord 24 having a plug 25 for making an electrical connection with a service outlet. The motor is mounted upon a base 26 (indicated in dot and dash lines in Fig. 2) and this base supports the motor and the saw blade 27 in a manner such that the saw blade may be raised and lowered for cutting depth and may also be angularly set as is well known in the art. The usual guard is indicated at 28. According to the present invention the hand saw is invertedly supported by a carriage disposed adjacent the table top 7. The hand saw is arranged with its blade projecting upwardly through the saw blade slot 11 a desired distance and the body of the hand saw is attached to the carriage 29 as by suitable fasteners which may be headed screws engaged in the holes 30 supplied in said carriage. In the use of the saw the work is held fast on the table and the carriage, together with the hand saw, is moved toward the work to bring the blade into cutting engagement therewith as usual. The carriage has an opening 31 to accommodate the saw blade and this opening is in alignment with the saw blade slot 11 as will be seen from an inspection of Fig. 2. The carriage 29 is a plate-like member supported in close proximity to the table top 7 by coplanar wheels engaged in ways secured to the table top at the underside thereof. Two such ways are employed and they are arranged one on each side of the saw blade slot 11 parallel thereto, which ways extend substantially for the full length of the table top.

The carriage supporting ways 32 and 33 are supplied with confronting grooves indicated at 34. Said confronting grooves are each engaged by a set of two wheels aforesaid. The grooves 34 are substantially V-shaped in cross section and the wheels are of the anti-friction type desirably provided with "nylon" tires of a shape corresponding to the cross section of the grooves. Said wheels are mounted upon the carriage in a co-planar arrangement and the set of wheels denoted at 35 at one side of the carriage are engaged in the groove of the way 32 whereas the other set of wheels 36 at the opposite side of the carriage are engaged in the groove of the way 33. Desirably one of the two wheels of each set is journalled on the carriage by a bracket 37 which permits the wheels to be adjusted to and away from the respective groove so that the carriage may be skewed to align the saw blade with the saw blade slot. Brackets 37 are attached to the carriage as by screws 38 engaged in slots 39 whereby the brackets may be adjusted to and away from each other—see Figure 2.

A distinctive feature of the structure is that the attachment of the ways includes attachment means comprising setting means for one of said ways whereby it may be adjustably constrained for movement to and away from the other way at least at one of its ends. Accordingly when the carriage is introduced into the grooves of the ways one of them can be adjusted relative to the other to provide for accurate free travel of the carriage and also to enable the carriage to be readily removed from one end of the table by a relative spreading movement of the ways as hereinafter more clearly dealt with.

The way 32 is fixed to the table top as by screws 40.

The other way, indicated at 33, is the adjustable one and its attachment to the table top includes the setting means referred to. The attachment of this way is afforded by screws 42 which are headed and have screw-threaded engagement with the table top. The screws are arranged at the ends of this way and the setting means is shown as including a clamping shoulder 43 (Fig. 3) on each of the two screws 42 for clamping engagement with the adjustable way 33. The clamping shoulders 43 enable the way 33 to be clamped firmly in place and also enable it to be held loosely by slackening of the screws to such an extent that the way may be moved to and away from the companion way 32. This adjustment is required for the precision setting of the ways in parallel relationship and to provide for such adjustment the screws 42 are placed in slots 44 provided in the way 33 which slots extend transversely as will be best seen from an inspection of Figure 2.

The way 33 is shown as being stressed inwardly as by compression springs 45 one at each end thereof. The compression springs are seated against the flange 8 of the table top 7. When screws 42 are slacked off, the springs act to press the way 33 inwardly, and first one of the screws can be tightened and then the other to acquire the proper setting for the free and accurate movement of the carriage. It may be here mentioned that way 33 may be attached in a manner to enable only one end to be adjusted in which case the other end would be secured as by an ordinary screw and the adjustable end would be supplied with the screw 42 lodged in the slot 44 and this end of the way would be acted on by a spring such as that indicated at 45.

Figure 3:
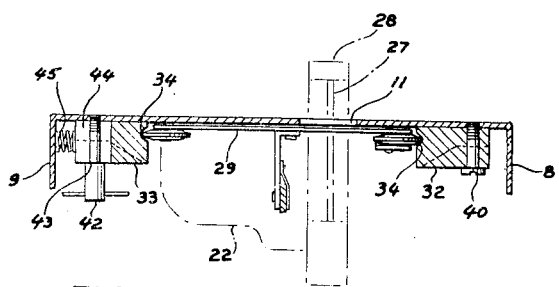
Fig. 3 is a transverse sectional view on line 3—3 of Fig. 2.

As an alternative mode of attaching the adjustable way 33, the springs 45 may be dispensed with and one of the screws 42 may be fitted in a hole in one end of the way so that this end may be made fast or may be temporarily held by the screw to serve as a pivotal connection to enable the other end of the way to be swung to and away from the companion way 32. The swinging end of the way 33 may be supplied with a screw such as that indicated at 42 lodged in the slot 44 so that it may be set in an adjusted position and loosened to allow the carriage to be removed by disengaging its wheels from the confronting grooves. Such an arrangement is desirable to provide a manual device for retracting the swingable end of the way 33. A manual device for retracting said swingable end is indicated in Fig. 2 of the drawing as comprising a lever 46 pivoted at 47 on a rod 48 projecting outwardly of a side of the table top 7 and secured to the way 33. The lever 46 has a handle portion 49 at one end and a cam face 50 at the other end. The cam face is arranged to engage the flange 8 of the table top when the lever is swung outwardly and in this way the swinging end of the way 33 is pulled or retracted to spread the ways at the one end of the table a distance sufficient to provide for disengagement of the carriage.

Desirably the treadle device for effecting movement of the carriage along with the electrically driven hand saw comprises a treadle plate 51 extending outwardly at an end of the main table and pivotally supported at 52 at its inner end as by the cross bar 18. The free outer end of said treadle plate is a depressible foot-engaging end and the pivoted end is integral with an upright bar 53 linked to the carriage 29 as by a pivotally connected link 54. A spring of the coil type is engaged with said upright bar 53 to stress it rearwardly for return movement of the carriage and the saw following a forward movement of the carriage and saw caused by depression of the treadle. The spring just referred to is indicated at 55 and may be otherwise arranged if so desired. Assuming that a workpiece is placed on the main table, it is only necessary to depress the treadle in order to advance the carriage and saw to bring the blade into cutting engagement with the workpiece.

Figure 4:
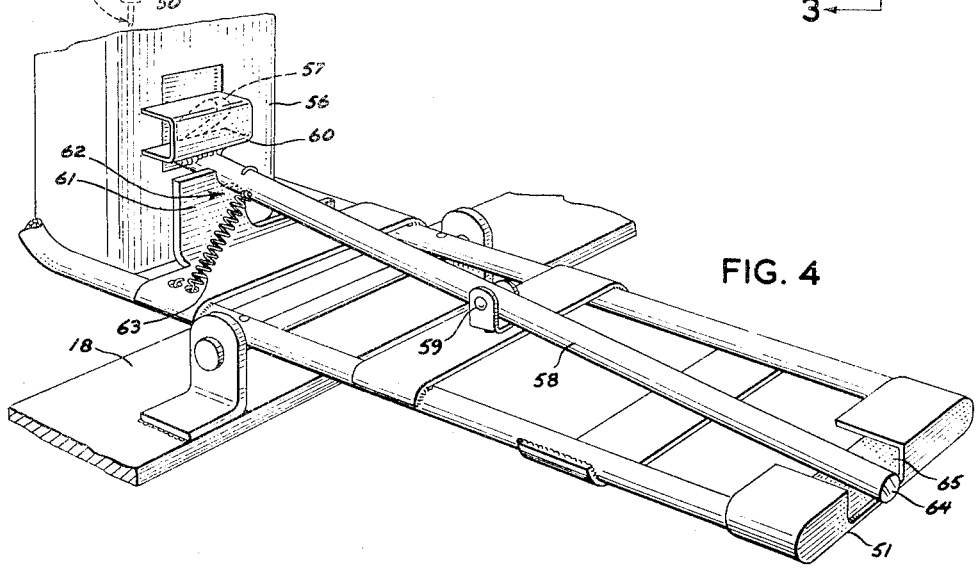
Fig. 4 is a perspective view on an enlarged scale of the treadle mechanism for travel of the carriage on which the portable hand saw is supported.

A feature of the treadle device is that it is supplied with a conventional on-and-off switch housed in the case 56 with its actuating lever 57 projecting through an opening in the case. Said switch is connected in the cord 24 for control of the circuit. A foot switch lever 58 is pivoted intermediate of its length as at 59 on the treadle plate 51 to rock thereon and to have a limited skewing movement. The inner end of the said foot switch lever has a U-shaped terminus 60 engaged with the actuating lever 57 so that when the inner end of the foot switch lever is elevated, as shown in Fig. 4, it will move the actuating lever 57 to the "on" position of the switch. Reversely, when the inner end of the foot switch lever is depressed the actuating lever 57 of the switch is moved to the "off" position of the switch. A stepped plate 61 is fixed on the inner end of the treadle plate 51 and provided with a cam face 62 on which said inner end of said foot switch lever may rest to lock said actuating lever of the switch in its "on" position. A helical tension spring 63 acts on the inner end of the foot switch lever 58 to draw it on the seat or cam face 62 as it is raised by foot pressure applied on the outer end 64. The outer end 64 is accommodated by a recess 65 in the free end of the treadle plate.

According to this arrangement, the operator may control the switch by foot pressure applied on the control lever 58 which is conveniently arranged on the treadle plate 51.

The supplemental table 66 is used conjointly with the main table and desirably is of metal construction. It comprises a top 67 having marginal flanges including the flange 68 (Fig. 5) adjoining the flange 8 of the main table top 7. Flanges 8 and 68 are in abutment and means are supplied to detachably connect the table top 67 to the table top 7. Desirably the attachment means comprises bolts 69 lodged in holes in the flange 8 and projecting outwardly therefrom and engaged in slot 70 supplied in the flange 68. Slot 70 has downwardly open ends and the bolts 69 are supplied with wing nuts 71 threadedly engaged thereon as best shown in Figure 5. On each bolt there is an L-shaped clip 72 which is pierced to receive the bolt which clip has engagement with the bottom edge portion of the flanges 8 and 68. Accordingly in the tightened condition of the wing nut 71 the flanges 8 and 68 are securely fastened together with the top surfaces of the tables flush with each other.

The supplemental table 67 is supported by legs 73 pivoted at 74 to fold inwardly. These legs are shown as consisting of telescopic members 74 and 75 locked in telescopic condition as by the provision of wing nuts 76. The wing nuts provide for adjustment of height of the table as well as to accommodate unevenness of a floor surface.

The top 67 is supplied with a slot 77 at right angles to the saw blade slot 11. Slot 77 accommodates the tongue of the clamp device 78 which forms a part of a gauge 79. This gauge is of the well-known type commonly used in a saw table for the positioning of work pieces to be operated on by the saw. It will be understood that the gauge may be set in any position along the slot 77 and clamped in a set position and angularly adjusted as required.

From the preceding description it will be manifest that my invention provides a highly serviceable and efficient power saw table and that such changes and variations may be resorted to as fairly come within the scope of the ensuing claims.

What I claim is:

1. In a power table saw, a horizontal support, supporting ways on said horizontal support and disposed in spaced co-extensive relation, said supporting ways including a fixed supporting way and a movable supporting way, the latter having transversely elongated slots at its ends, fastening means securing said fixed supporting way to said horizontal support, shouldered screws lodged freely in said transversely elongated slots and threadedly engaged in said horizontal support, said screws having shouldered engagement with said movable way for holding said movable supporting way against movement when said screws are drawn up tight in clamping condition, compression springs arranged on said horizontal support and seated against said movable way for pressing it toward said fixed way when at least one of said screws are slackened off, a saw carriage having sets of wheels by which it is mounted in grooves supplied in said supporting ways, and at least one manual lever pivoted on said movable way and having a cam face engageable with said horizontal support for exerting a positive retracting force on said movable way for spreading it away from said fixed way when said screws are slackened off whereby said carriage may be removed.

2. A power table saw comprising a table top provided with a longitudinally extending saw-blade slot, a pair of carriage-supporting ways disposed subjacent said table top and arranged one on each side of said saw-blade slot in parallel relation thereto, attachment means for said ways for securing them to said table top in such manner that one of said ways has limited movement to and away from the other way at least at one of its ends to facilitate introduction and removal of a carriage, said attachment means for the movable way including a first fastener serving to accommodate pivotal movement of one end of said adjustable way, so as to allow the other end thereof to swing to and away from said other way, a headed screw providing a second fastener serving to accommodate movement of said swinging end of said movable way, said headed screw having a shouldered shank lodged loosely in a transverse slot provided in said movable way with its shoulder seated on said movable way to apply clamping pressure thereon in the tightened condition of said screw, a spring acting on said swingable end of said movable way to press it toward said other way when said screw is loosened, a manual device for retracting said swingable end, a carriage for supporting a portable electrically driven hand saw with its circular blade projecting upwardly through said saw-blade slot, said carriage having co-planar wheels engaged in confronting grooves supplied in said ways whereby said circular saw many travel in said saw-blade slot by movement of said carriage.

3. A power table saw comprising a table top provided with a longitudinally extending saw-blade slot, a pair of carriage-supporting ways disposed subjacent said table top and arranged one on each side of said saw-blade slot in parallel relation thereto, attachment means for said ways for securing them to said table top in such manner that one of said ways has limited movement to and away from the other way at least at one of its ends to facilitate introduction and removal of a carriage, said attachment means for the movable way including a first fastener serving to accommodate pivotal movement of one end of said adjustable way, so as to allow the other end thereof to swing to and away from said other way, a second fastener serving to accommodate movement of said swinging end of said movable way, a spring mounted on said table top and arranged to press said swingable end of the movable way toward said other way, a hand lever pivoted on said swingable end having a cam face engageable with a surface of said table top for retracting said swingable end, and a carriage for supporting a portable electrically driven hand saw with its circular blade projecting upwardly through said saw-blade slot, said carriage having coplanar wheels engaged in confronting grooves supplied in said ways whereby said circular saw may travel in said saw-blade slot by movement of said carriage.

References Cited in the file of this patent

UNITED STATES PATENTS

| Number | Name | Date |
|---|---|---|
| 71,126 | Bragdon | Nov. 19, 1867 |
| 206,648 | Tucker | July 30, 1878 |
| 722,900 | Reilly | Mar. 17, 1903 |
| 816,295 | Brooks | Mar. 27, 1906 |
| 1,792,955 | Willis | Feb. 17, 1931 |
| 1,813,783 | Tomlinson et al. | July 7, 1931 |
| 1,910,534 | Glasner | May 23, 1933 |
| 1,930,168 | Hall | Oct. 10, 1933 |
| 2,075,282 | Hedgpeth | Mar. 30, 1937 |
| 2,230,929 | Bary et al. | Feb. 4, 1941 |
| 2,247,135 | Romano et al. | June 24, 1941 |
| 2,525,712 | Neighbour | Oct. 10, 1950 |
| 2,555,217 | Young | May 29, 1951 |
| 2,623,135 | Bruegger | Dec. 23, 1952 |
| 2,672,378 | McVey | Mar. 16, 1954 |
| 2,697,458 | Cue | Dec. 21, 1954 |
| 2,699,188 | Caldwell | Jan. 11, 1955 |
| 2,810,412 | Roug | Oct. 22, 1957 |
| 2,929,420 | Gresdel | Mar. 22, 1960 |